United States Patent [19]
Krynski et al.

[11] 3,959,148
[45] May 25, 1976

[54] ROTARY LEAF FILTER WITH INDEPENDENTLY MOVABLE SLUICE ARMS

[75] Inventors: John E. Krynski, East Moline; Roland L. Laugel, Moline, both of Ill.

[73] Assignee: Ametek, Inc., New York, N.Y.

[22] Filed: July 11, 1974

[21] Appl. No.: 487,438

Related U.S. Application Data

[63] Continuation of Ser. No. 327,228, Jan. 26, 1973, abandoned.

[52] U.S. Cl. .............................. 210/334; 210/346
[51] Int. Cl.² .................. B01D 29/38; B01D 29/24
[58] Field of Search ............... 15/250, 14; 134/180, 134/181; 210/81, 327, 332, 334, 346, 413, 414

[56] References Cited
UNITED STATES PATENTS

| | | | |
|---|---|---|---|
| 1,502,700 | 7/1924 | Vallez | 210/334 |
| 2,132,303 | 10/1938 | Lathrop | 134/180 UX |
| 3,023,756 | 3/1962 | Proctor | 134/181 X |
| 3,680,702 | 8/1972 | Weinstein | 210/334 X |
| 3,754,659 | 8/1973 | Krynski et al | 210/334 |

FOREIGN PATENTS OR APPLICATIONS

| | | | |
|---|---|---|---|
| 75,359 | 10/1892 | Germany | 210/334 |

*Primary Examiner*—Charles N. Hart
*Assistant Examiner*—Robert H. Spitzer
*Attorney, Agent, or Firm*—Smythe & Moore

[57] ABSTRACT

A pressure leaf filter with a pair of sluicing assemblies oscillatable independently of each other to spray sluicing fluid on said leaf elements to remove filter cake. The sluice arms can have fixed or rotatable nozzles. A control means is provided to energize electric or fluid operated motors at predetermined times so that the sprays of the nozzles do not interfere with each other.

6 Claims, 7 Drawing Figures

ROTARY LEAF FILTER WITH INDEPENDENTLY MOVABLE SLUICE ARMS

This is a continuation of application Ser. No. 327,228, filed Jan. 26, 1973, now abandoned.

This invention relates to pressure leaf filters and particularly to the sluicing sprays for removing filter cake.

In known forms of pressure leaf filters, the liquid to be clarified is introduced into a tank in which are mounted a plurality of spaced filter leaf elements. The liquid flows into contact with filter leaves, and the solids within the liquid accumulate on the outer surfaces of the filter leaves to form filter cake as the clarified liquid passes through the leaves. The filter eventually has cake accumulate on the leaves to the point where the operational efficiency of the filter is impaired. When the pressure drop through this cake of collected solids reaches some predetermined level, the filtering cycle is stopped and the solids removed. The filter cake may be removed either in dry form by scraping or by rinsing or by washing off by directing high velocity jets or sprays of liquid onto the accumulated filter cake. This method of washing the filter cake off of the filter leaf elements is known in the art as "sluicing."

In sluicing, a liquid is directed at the cake on the filter septum in such fashion and at such an energy level so as to erode the cake and remove the solids as a more or less concentrated slurry. Sometimes the mother liquor remaining in the cake is of such a nature that it aids in binding the solid particles into a cohesive whole. Because of the nature of the process and processing conditions, additional solids may be precipitated or deposited in the cake thereby tending to knit the cake into a monolithic structure. In these cases, the sluicing liquid performs a secondary function of diluting or dissolving, and thus aids in the eroding effect in resuspending the solids. Regardless of this latter effect or any other secondary function of the sluicing liquid, its main purpose is to convey erosive energy to the accumulated filter cake. The effectiveness of the sluicing action is dependent upon the effectiveness of this transfer of energy.

One of the objects of the present invention is to provide an improved sluicing assembly for a pressure filter.

Another object of the present invention is to provide a sluicing assembly which maximizes the sluice intensity delivered along with the maximum filter septum coverage.

In one aspect of the invention, a pair of crankshaped pivotable sluice arm assemblies are provided, there being spray nozzles on a longitudinally extending portion of the arm assembly to direct sluicing fluid on the filter leaf surfaces. There are independent drives for each assembly and control means for oscillating or pivoting the assemblies at random or non-synchronously so that the sprays will not interfere with each other. The control means also can be arranged so that one assembly finishes its oscillation before the other starts or so as to operate in an alternating relationship. In one form, the nozzles do not rotate in relation to its crank arm, and in another form, the nozzles oscillate relative to its crank arm.

When opposing sluices meet each other, for example, when horizontal, the sluiced solids tend to be packed toward the center. In the present invention, an unopposed sluicing spray tends to make a clean sweep.

In alternate arrangements of control, a sluice arm need not make a complete up and down cycle but can be stopped at the top and then shut off. Then, the other sluice arm moves up, shuts off and is followed by the first sluice arm turning on, moving back down, and shutting off. Then the second sluice arm turns on and returns. The cycles can be as many as needed to complete the sluicing.

Other objects, advantages and features of the present invention will become apparent from the accompanying description and drawings, which are merely exemplary.

In the drawings.

Proceeding next to the drawings, like reference numerals indicate the same parts, where appropriate, in the various figures.

Figure 1:
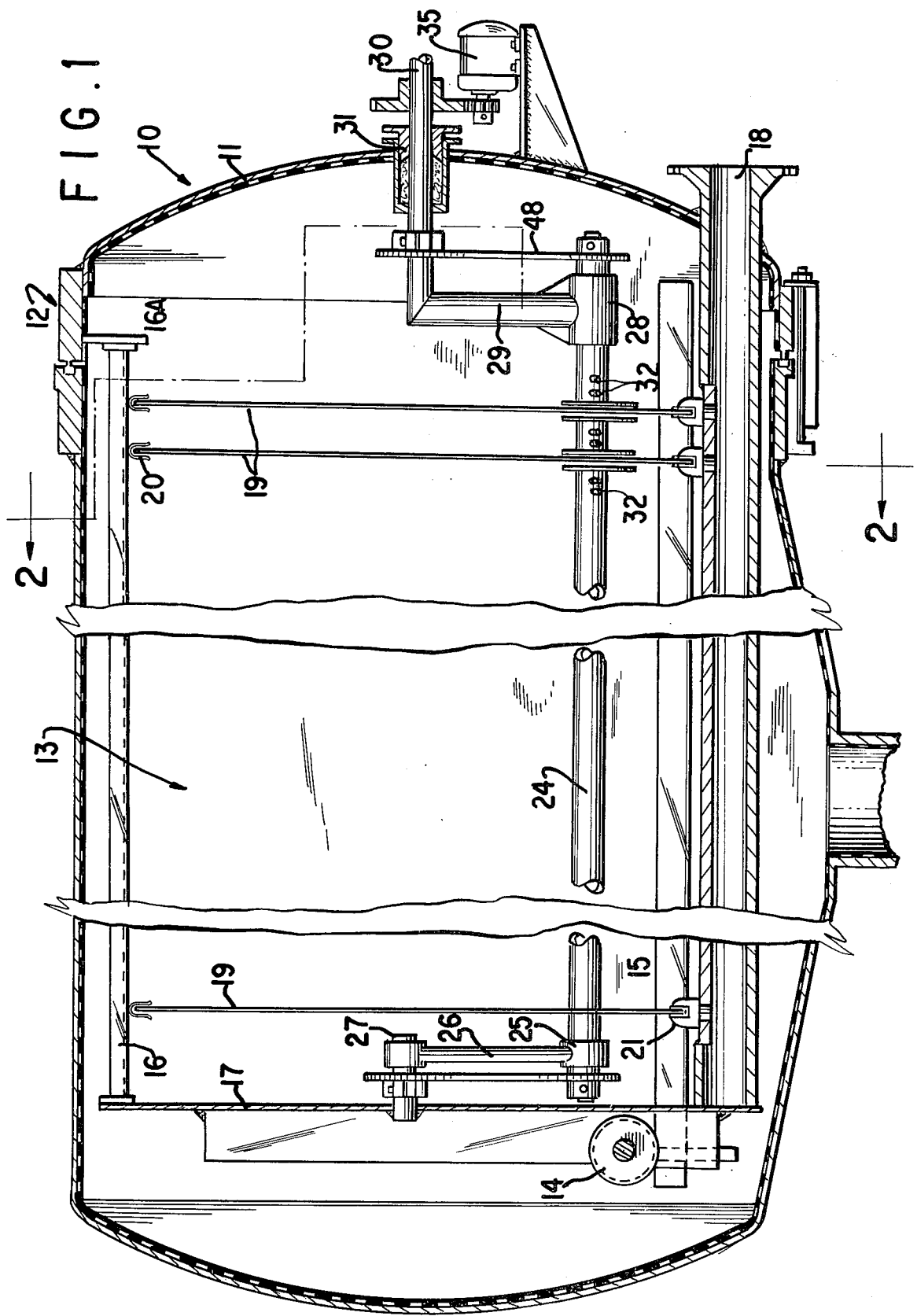
FIG. 1 is a vertical longitudinal sectional view of a horizontal filter tank incorporating the sluicing assembly of the present invention.

As can be seen in FIG. 1, the present invention is incorporated in a filter tank which is horizontally disposed and indicated generally at 10 having a removable cover 11 at one end and retained in sealed relation by means of swinging bolt arrangement 12, as is known in the art.

Filter leaf carriage 13 is attached to removable cover 11 so as to be movable therewith. Frame or carriage 13 is carried on wheels or rollers 14 on rails 15. The frame 13 also has an upper supporting member 16 which has one end attached at 16A to cover 11 and the other end attached to a rear frame member 17. The frame also comprises a pipe 18 which also is attached to the rear frame member 17.

Figure 5:
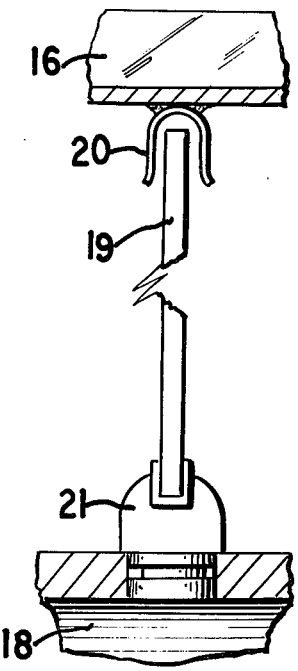
FIG. 5 is a broken enlarged portion of FIG. 1 showing mounting of a filter leaf element.
Figure 6:
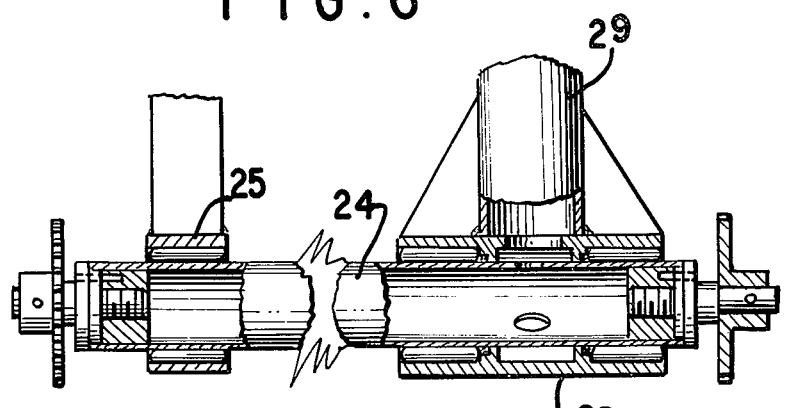
FIG. 6 is a broken longitudinal sectional view of the pivotally mounted sluice pipe shown in FIG. 1.

A plurality of filter leaf elements 19 are supported between brackets or guides 20 on upper frame member 16 and brackets 21 on pipe 18 in a manner known in the art and seen in greater detail in FIG. 5. The lower bracket or channel-shaped member 21 also functions as a drain and has an opening therein which communicates with the outer periphery of a filter leaf element and the interior of pipe 18.

The lower portion of the tank 10 inclines downwardly and has a central cake discharge opening or pipe 22.

The sluicing assembly comprises a pair of similar sluice arms indicated generally at 23, each of which is generally crank-shaped or U-shaped. Each sluice pipe 24, which extends longitudinally of the filter elements 19, is positioned outwardly thereof.

In a preferred form of the invention, each sluice pipe 24 can have one end rotatably supported at 25 on leg 26 which is pivoted about shaft 27 fixed in the rear frame member 17. The other end of sluice pipe 24 is journalled at 28 to leg 29 which is tubular and is connected at its upper end to a substantially horizontal tubular liquid inlet shaft 30 which extends outwardly of cover 11 through packing 31 and is connected to a source of sluicing liquid, not shown.

Figure 2:
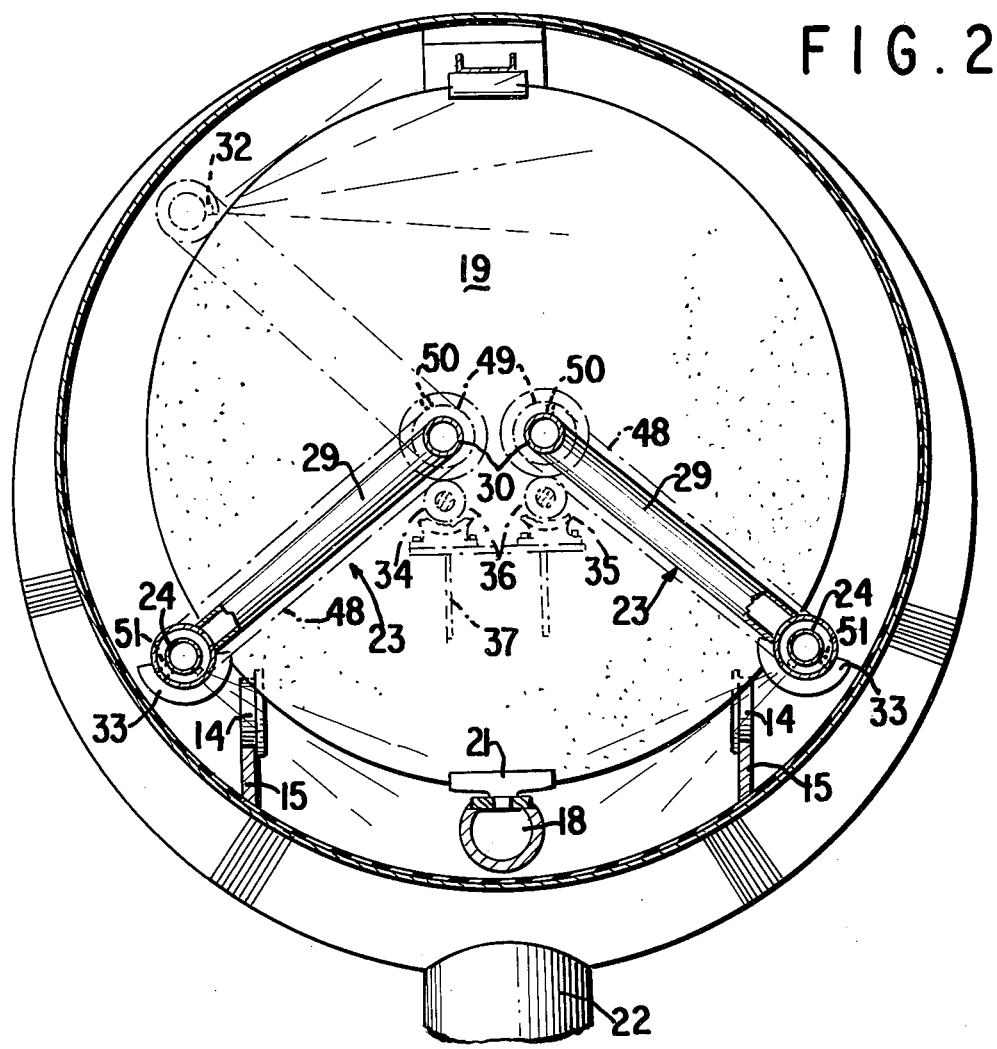
FIG. 2 is a sectional view taken along the line 2—2 of FIG. 1.

As may be seen in FIG. 2, the shafts 30 of the sluice arms are spaced from each other and are on a horizontal plane which intersects the central longitudinal axis of filter elements 19. The axes of rotation of the shafts 27, 30 of a sluice arm assembly are the same.

Positioned along the length of sluice pipe 24 are a plurality of spray nozzles 32 with the nozzles being positioned adjacent opposing faces of a filter leaf element, as can be seen in FIG. 1. Leaf guide 33 serves to guide the filter leaf into proper relationship with the nozzles. Various arrangements of spray nozzles can be employed.

As previously mentioned, the sluice arms are arranged so as to oscillate separately from each other and in a non-synchronized relation so as to avoid undesirable interference of the sprays with each other, as is the case when the arms move together in the same direction.

The sluice arm assemblies can be oscillated in various manners. In the form shown in FIGS. 2 and 3, separate reversible electric drive motors 34, 35 independently drive the gears 36 through respective shaft 30. The motors 34, 35 are supported on bracket 37 attached to the cover 11.

The motors can be connected to suitable controls to oscillate the sluice arms as desired in a non-synchronous manner.

Figure 3:
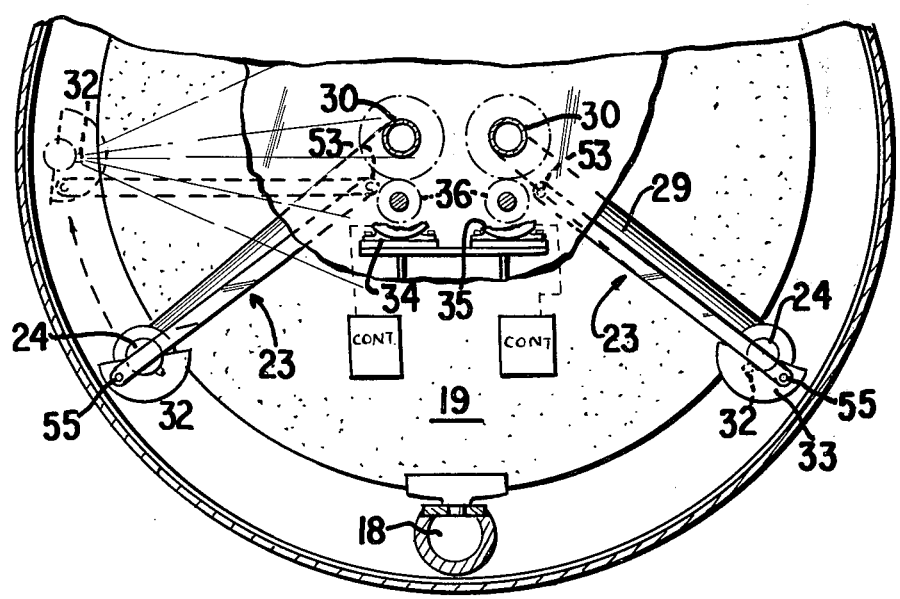
FIG. 3 is a fragmentary view similar to FIG. 2 except a linkage arrangement for rotating the nozzles is shown.
Figure 4:
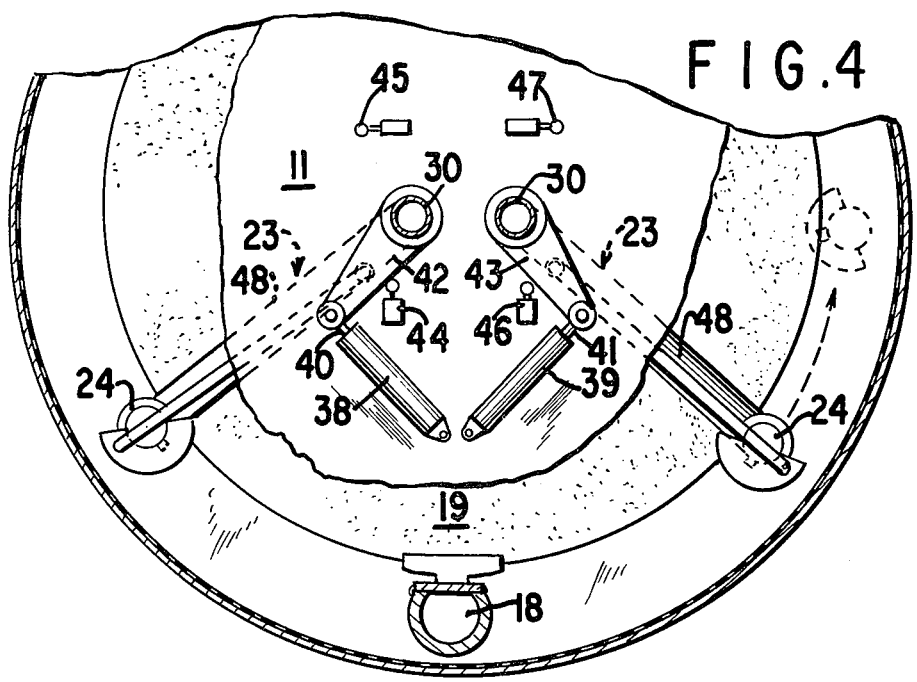
FIG. 4 is a fragmentary end view showing an alternate form of oscillating means for the headers, the central portion of the figure looking from the outside of the end cover.

Instead of electric motors, the shafts 30 can be driven by fluid-operated motors 38, 39 (FIG. 4). Each motor has a piston 40, 41 connected to an arm 42, 43. Limit switches 44, 45 and 46, 47 are arranged to be contacted by the arms 42, 43 to reverse direction of travel of a sluice arm by controlling fluid or hydraulic valves controlling fluid to and from the motor. The limit switches also can be connected through control relays (not shown) so that the movement of a sluice arm is not commenced until the other arm has made a complete oscillation and returned to its starting point. Similar limit switches and controls also can be provided for the electric motor drives of FIGS. 2 and 3.

Rotation of the sluice pipe carrying the nozzles will now be described. It is preferably that the nozzles be rotated in timed relation to movement of the sluice arm. At the same time the sluice arm is oscillated, it also is possible not to provide for rotation of the nozzles.

If the nozzles are to be rotated simultaneously with the pivoting movement of a sluice arm, the sluice pipe can be pivoted through an angle of about 155° so that the spray nozzles move through a similar angle to distribute sluicing spray over the surfaces of the filter leaf elements. In the form shown in FIG. 2, flexible band or cable 48 extends around sluice pipe 24 and around a disc 49 positioned concentrically with shaft 30. Pins 50, 51 secure the cable against movement with respect to disc 49 and pipe 24 so that the oscillation of the sluice arm will cause a rotation of the sluice pipe 24.

Figure 7:
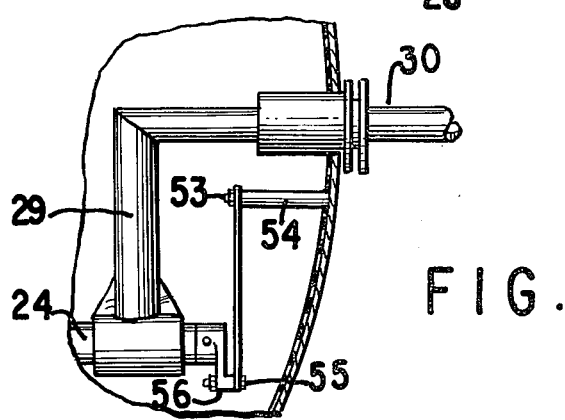
FIG. 7 is a broken fragmentary sectional view showing the means illustrated in FIG. 3 for causing rotation of the nozzles or sluice pipe.

In another form, as shown in FIGS. 3 and 7, rotation of the sluice pipe is accomplished by use of a link 52 which has one end pivotally connected at 53 to a stationary post 54 on the cover. The other ends of links 52 are connected at 55 to a crank arm 56 (FIG. 7) mounted on the end of the sluice pipe 24. Thus, as the sluice arm assembly pivots through an angle of about 80°, the sluice pipe 24 and nozzles 32 will also be pivoted through their own angles of about 155°.

As a sluice arm assembly moves upwardly or downwardly, fluid from the spray nozzles erodes or undercuts the cake. A specific arrangement of nozzles is shown in Assignee's copending application Ser. No. 150,064, filed June 4, 1971 now abandoned. This invention is an improvement over Assignee's copending application Ser. No. 150,065, filed June 4, 1971 now abandoned.

Another cycle would be where the first sluice arm moves to the top of its travel and the fluid shuts off. The control then would start movement of the other sluice arm and shut it off at the top. The first sluice arm then would be activated and moved to the bottom of its travel where it shuts off. Upon the first arm means reaching its original down position, the second arm means would be activated and returned to its original position. Various arrangements of control devices, including suitable circuitry known in the art, can be connected together to so control the sluicing movements.

It will be understood that various details of construction and arrangement of part may be made without departing from the spirit of the invention except as defined in the appended claims.

What is claimed is:

1. In a filter having a plurality of transverse filter leaf elements spaced along the axis of the filter, filter cake being depositable on the surfaces of said elements, the combination including a sluicing assembly comprising at least a pair of crank-shaped sluice arm means with longitudinally extending portions parallel to the axis of the filter and coextensive with the filter leaf elements, one of said arm means being on one side of said leaf elements and the other of said arm means being on the other side of said leaf elements, each arm means being mounted for pivotal oscillatory movement about an axis parallel to the axis of the filter, said sluice arm means and longitudinally extending portions being hollow and connected to a source of sluicing fluid, spray nozzles on said longitudinally extending portions positioned to direct sluicing fluid against and generally parallel to the faces of the filter leaf elements, so that sluicing fluid can be directed onto cake from either side of the filter and into filter cake on the surfaces of the leaf elements as a sluice arm means is pivoted so as to erode and remove filter cake thereon, independent drive means for each of said sluice arm means for pivoting the same when energized, and control means for energizing said drive means independent of each other and so that sluicing fluid from one side of said filter does not impinge on sluicing fluid from the other side of said filter whereby the sluicing fluid from each sluice arm as it sweeps said leaf elements will be unopposed by the sluicing fluid of the other sluice arm.

2. In a filter as claimed in claim 1 wherein said longitudinally extending portions have means to rotate the same concurrently with the pivoting of the arm means upon which the longitudinally extending portion is carried.

3. In a filter as claimed in claim 1 wherein said control means operates one of said sluice arm means through one oscillation and then the other sluice arm means thereafter so that movement of said sluice arm means is alternate relative to each other.

4. In a filter as claimed in claim 3 wherein said longitudinally extending portions have means to rotate the same concurrently with the pivoting of the arm means upon which the longitudinally extending portion is carried.

5. In a filter as claimed in claim 1 including control means for said sluice arm means whereby one sluice arm means moves through one part of an oscillation and is stopped, the other sluice arm means then being moved to one part of an oscillation, the first then returning to its original position followed by the other.

6. In a filter as claimed in claim 5 wherein said longitudinally extending portions have means to rotate the same concurrently with the pivoting of the arm means upon which the longitudinally extending portion is carried.

* * * * *